United States Patent [19]

Moran

[11] Patent Number: 4,616,722

[45] Date of Patent: Oct. 14, 1986

[54] WEIGHING APPARATUS WITH COMPARTMENTALIZED WEIGHING BUCKET

[75] Inventor: Michael J. Moran, Raleigh, N.C.

[73] Assignee: USM Corporation, Farmington, Conn.

[21] Appl. No.: 717,002

[22] Filed: Mar. 28, 1985

[51] Int. Cl.⁴ .................. G01G 13/22; G01G 19/22; G01G 13/16

[52] U.S. Cl. .................................... 177/99; 177/25; 177/59; 177/90

[58] Field of Search .................. 177/90, 91, 94–99, 177/103, 25, 59, DIG. 12

[56] References Cited

U.S. PATENT DOCUMENTS

| | | | |
|---|---|---|---|
| 379,231 | 3/1888 | Lamb | 177/91 X |
| 419,948 | 1/1890 | Henry | 177/91 |
| 3,022,843 | 2/1962 | Watson et al. | 177/98 |
| 3,734,215 | 5/1973 | Smith | 177/99 X |
| 4,418,771 | 12/1983 | Henry et al. | 177/103 X |

FOREIGN PATENT DOCUMENTS 132108 1/1985 European Pat. Off. ............ 177/90

Primary Examiner—E. A. Goldberg
Assistant Examiner—Patrick W. Foster
Attorney, Agent, or Firm—Leydig, Voit & Mayer, Ltd.

[57] ABSTRACT

A computerized scale in which each weighing bucket is formed by two side-by-side compartments and by a single door which shuttles back and forth between two positions beneath the compartments. Each time the door changes positions, it closes one compartment to permit product to be dropped into and weighed in such compartment and, at the same time, opens the other compartment to permit previously weighed product to fall therefrom. As a result, one compartment is filled as the other compartment is being emptied so as to significantly increase the cycle rate of the scale.

11 Claims, 5 Drawing Figures

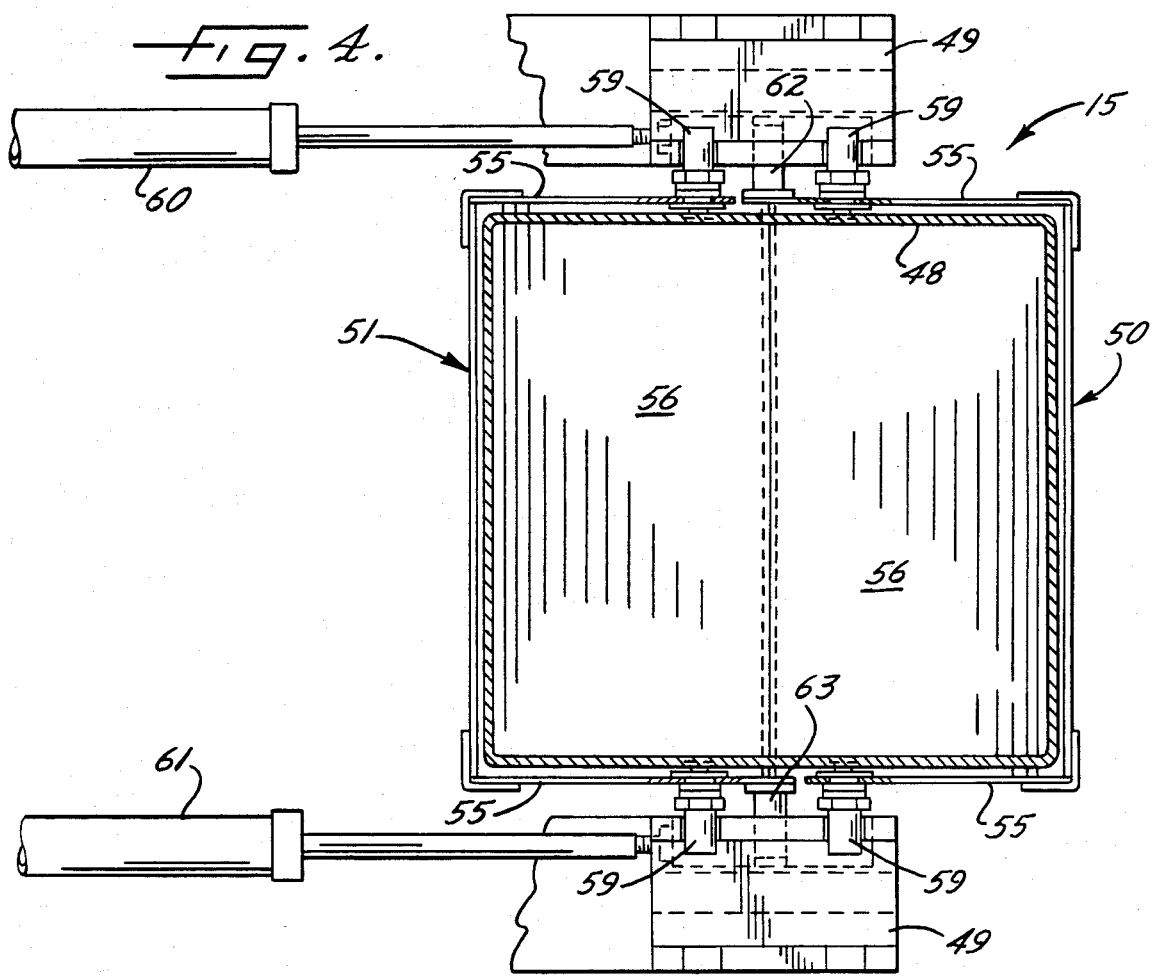
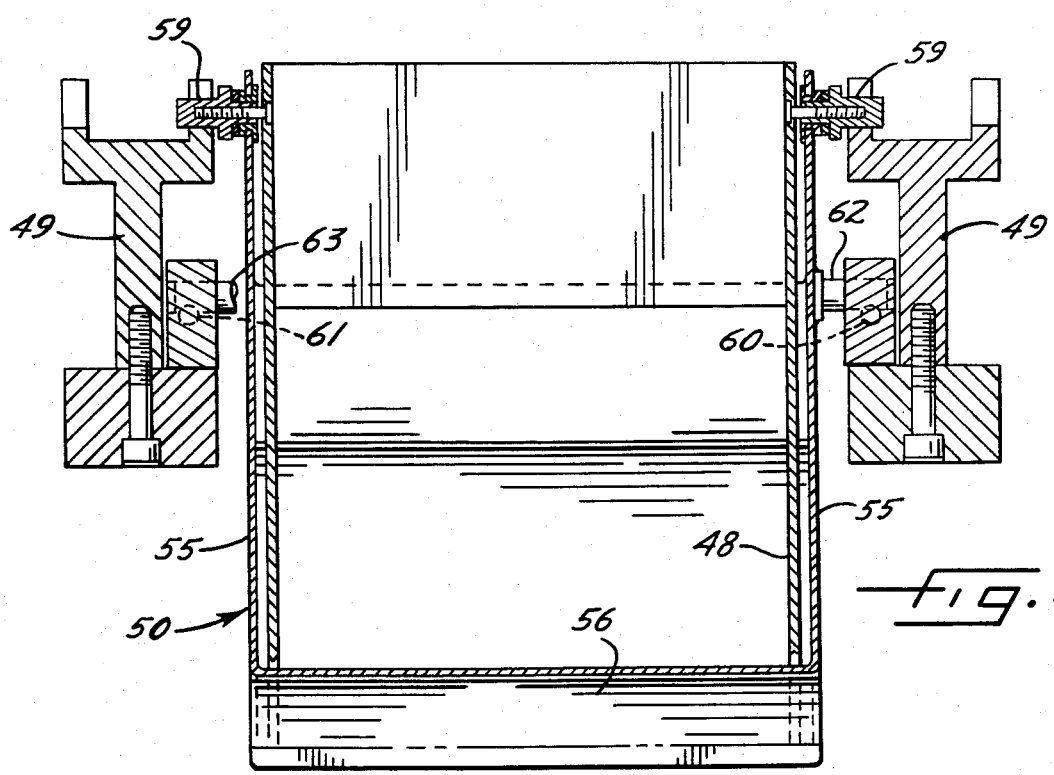

WEIGHING APPARATUS WITH COMPARTMENTALIZED WEIGHING BUCKET

BACKGROUND OF THE INVENTION

This invention relates generally to apparatus for weighing product and, more particularly, to a computerized scale for weighing product just prior to packaging of the product by an automatic packaging machine.

In general, a computerized scale of the foregoing type includes a series (e.g., ten) of so-called weighing buckets each associated with an underlying load cell or other means for producing an electrical signal representative of the weight of product in the bucket. Located above each weighing bucket is a holding bucket which contains a quantity of the product to be packaged. During each cycle, each empty weighing bucket is filled with product by momentarily opening the overlying holding bucket and allowing the product to fall into the weighing bucket. The weight of the product dropped into each weighing bucket is substantially less than the total weight of product which subsequently is placed in each package by the packaging machine.

After all of the weighing buckets have been filled, a computer responds to the weight signals produced by the different load cells, adds the weights in various combinations of weighing buckets and then selects the particular combination of buckets that meets the minimum statistical weight for the package to be filled while providing the least excess weight. The weighing buckets of that particular combination then are emptied and the product therein is delivered to the packaging machine to be deposited in the package.

The weighing bucket used in most conventional commercially available computer scales includes door means in the form of one or two hinged doors adapted to be opened to dump the product from the weighing bucket after the product has been weighed. After the product falls clear of the weighing bucket and the door means, the door means close and then the weighing bucket is re-filled by dumping an additional batch of product into the weighing bucket from the overlying holding bucket. Because the falling product must clear the weighing bucket and the door means before the door means can close, a computerized scale with ten conventional weighing buckets can not accurately cycle at rates much greater than sixty weighs per minute.

SUMMARY OF THE INVENTION

The general aim of the present invention is to provide weighing apparatus of the above general type having a new and improved weighing bucket which is capable of being filled at the same time it is being emptied so as to decrease the cycle time and to enable the scale to operate accurately at significantly higher cycle rates than has been possible heretofore.

A more detailed object of the invention is to achieve the foregoing by providing a unique weighing bucket which is formed by two side-by-side and alternately filled compartments and by a single door which shuttles back and forth between two positions beneath the compartments. Each time the door changes positions, it closes one compartment to permit product to be dropped into and weighed in such compartment and, at the same time, the door opens the other compartment to permit the previously weighed product to fall therefrom. Since the door starts closing one compartment as it starts opening the other compartment, filling of the empty compartment may begin at substantially the same time that the door starts closing and without delaying such closing while waiting for the previously weighed product to fall clear of the door.

A further object of the invention is to provide a novel holding bucket for alternately filling the two compartments of the weighing bucket, the holding bucket being particularly characterized by the provision of gates which are capable of pivoting between open and closed positions without significantly fanning the product in the weighing bucket.

These and other objects and advantages of the invention will become more apparent from the following detailed description when taken in conjunction with the accompanying drawings.

BRIEF DESCRIPTION OF THE DRAWINGS

FIG. 4 is an enlarged fragmentary cross-section taken substantially along the line 4—4 of FIG. 1.

FIG. 5 is an enlarged cross-section taken substantially along the line 5—5 of FIG. 1.

DETAILED DESCRIPTION OF THE PREFERRED EMBODIMENT

Figure 1:
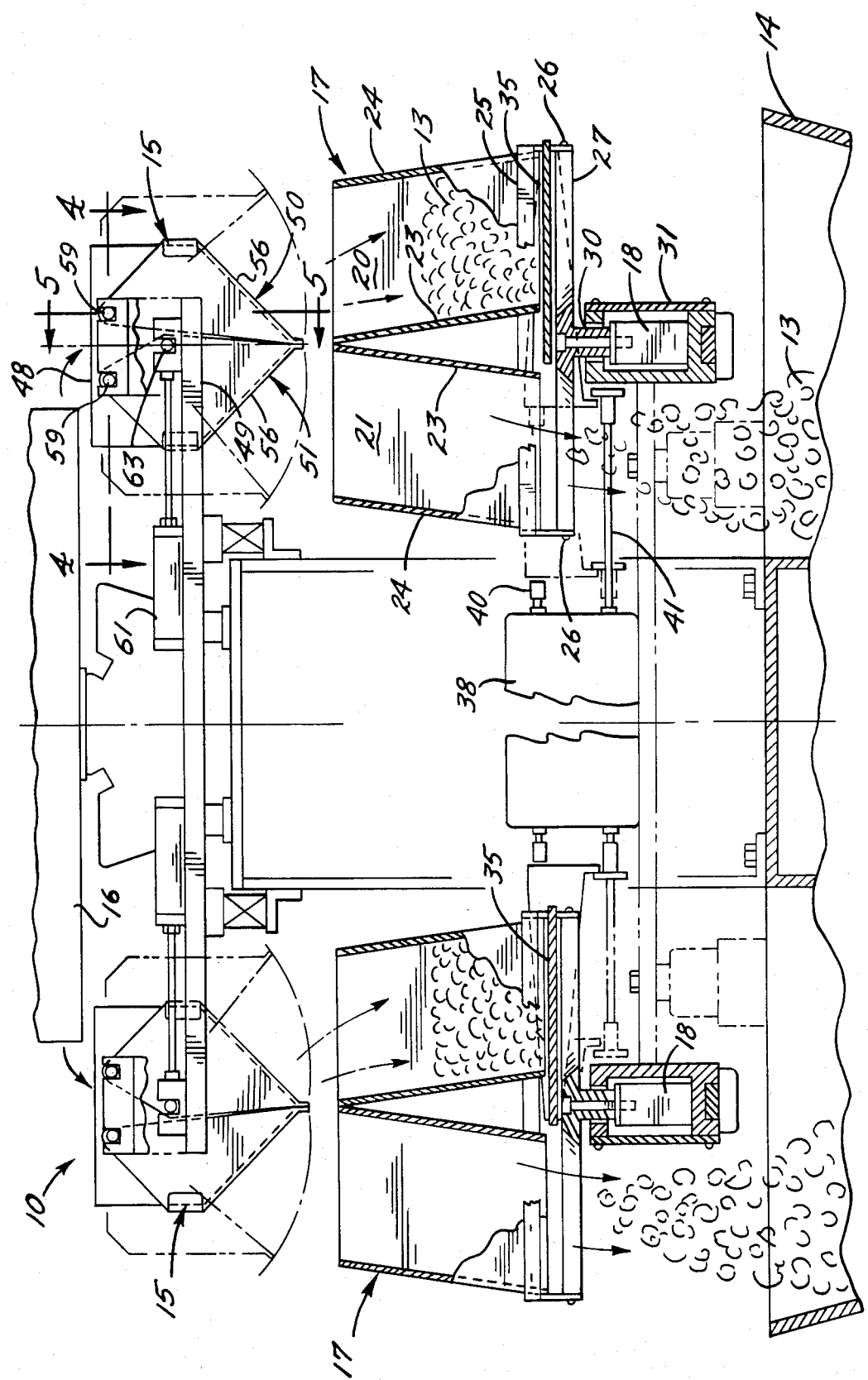
FIG. 1 is an elevational view of new and improved weighing apparatus incorporating the unique features of the present invention, certain parts being broken away and shown in section.

As shown in the drawings for purposes of illustration, the invention is embodied in apparatus 10 for weighing product 13 prior to delivery of the product to the filling funnel 14 of an automatic packaging machine of the type disclosed, for example, in Monsees et al U.S. Pat. No. 4,423,585. The product may be a snack food such as potato chips which are separated into batches, weighed and then delivered through the funnel and deposited into packages made automatically by the packaging machine.

The weighing apparatus 10 which has been specifically shown forms part of a computerized scale which weighs the product 13 and insures that the batch of product deposited in each package always meets a specified minimum or statistical weight while exceeding that weight by as little as practically possible. In general, the weighing apparatus includes metering means in the form of upwardly opening holding buckets 15 adapted to contain product received from an overhead supply which has been indicated schematically at 16. The holding buckets are periodically opened and drop a quantity of product into underlying weighing buckets 17 which rest on load cells 18 or other force-to-electrical signal transducers. The signal produced by each load cell is representative of the weight of the product in the overlying bucket 17 and is routed to a microprocessor or the like.

The drawings show two groups of holding buckets 15, weighing buckets 17 and load cells 18, there being one group shown at each side of the funnel 14 so that each weighing bucket may drop its product into the funnel after the product has been weighed. In a typical scale, four additional groups are located at each side of the funnel and thus the overall scale includes a total of ten groups with the weight signal from each of the ten load cells being transmitted to the microprocessor.

The weight of the product deposited in each weighing bucket 17 from its overlying holding bucket 15 is only a fraction of the total weight of the product with which each package is ultimately filled. For example, approximately three ounces of product may be dropped into each weighing bucket while the package itself may be filled with fourteen ounces of product.

After all of the weighing buckets 17 have received product 13, the microprocessor adds in all possible combinations the weights represented by the load cell signals and selects the best combination of weights to meet the statistical package weight while minimizing overfilling. The microprocessor then produces a signal to cause emptying of those particular weighing buckets 17 which make up the selected combination. In a given cycle, for example, the microprocessor may cause five of the weighing buckets to empty into the funnel 14 while the remaining five buckets remain filled until selected and emptied during subsequent cycles.

In accordance with the present invention, each weighing bucket 17 is uniquely arranged so as to enable the weighing bucket to be filled with a fresh batch of product at the same time a previously weighed batch of product is being dropped from the weighing bucket and into the funnel 14. As a result of each weighing bucket being simultaneously emptied and filled, the time required for each weighing cycle is substantially reduced so as to significantly improve the speed of the weighing apparatus 10.

Specifically, each weighing bucket 17 is formed by two generally upright and side-by-side compartments or containers 20 and 21. Each container is separately fabricated from stainless steel or the like and includes open upper and lower ends. Preferably, adjacent inboard sides 23 of the two containers are welded together at their upper ends and are inclined so that such sides diverge away from one another as they progress downwardly. The inclined sides 23 enable the upper ends of the containers to be located closely together while allowing the lower ends of the containers to be spaced apart. The outboard side 34 of each container extends parallel to the inboard side thereof.

The two containers 20 and 21 of each weighing bucket 17 are welded to an open rectangular frame 25 located at the lower ends of the containers. The frame, in turn, is secured removably at 26 to a lower framework 27 and may be quickly detached therefrom to enable the containers to be cleaned. A projection 30 extends downwardly from the framework and into a hollow, longitudinally extending beam 31 and is secured directly to the load cell 18, the latter being housed within the beam.

Figure 2:
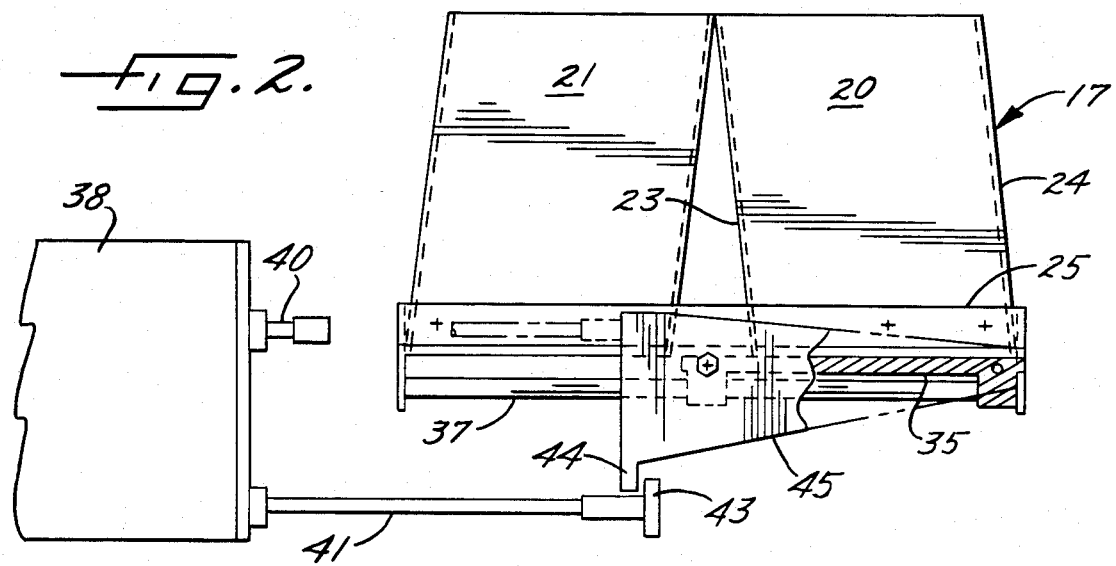
FIG. 2 is an enlarged view of certain parts illustrated in FIG. 1 and shows the door of the weighing bucket in one of its positions.

In carrying out the invention, a door 35 is mounted to shuttle back and forth beneath the lower ends of the containers 20 and 21 of each weighing bucket 17. When the door is in one position, it closes the container 20 and opens the container 21 as shown in FIG. 2 and at the right hand side of FIG. 1. When the door is shifted to its other position, it opens the container 20 and closes the container 21 (see FIG. 3 and the left-hand side of FIG. 1).

Figure 3:
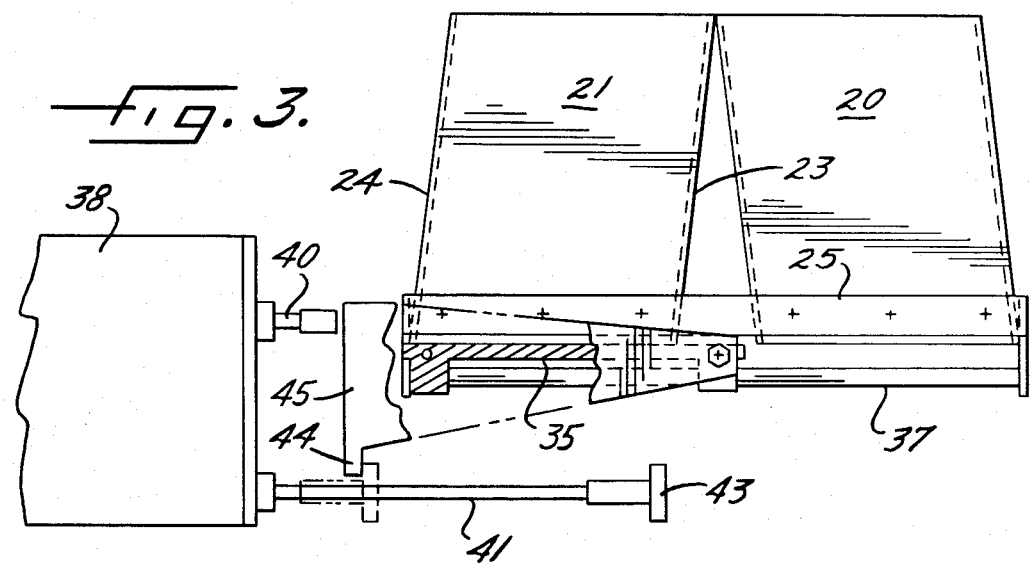
FIG. 3 is a view similar to FIG. 2 but shows the door in its other position.

In the present instance, the door 35 is mounted for back and forth horizontal shifting between its two positions by two spaced guide rods 37 (only one of which is shown in FIGS. 2 and 3) secured to and located beneath the frame 25. Shifting of the door between its positions is effected by mechanism 38 which de-couples from the door during the weighing portion of the cycle so that the accuracy of the weigh signal will not be affected by the shifting mechanism and vibrations therein. Herein, the shifting mechanism includes an upper and normally retracted reciprocating rod 40 and a lower and normally extended reciprocating rod 41, there being pneumatic cylinders (not shown) for reciprocating the rods.

When the door 35 fully closes the container 20 as shown in FIG. 2, the rod 41 is extended and a finger 43 on the end thereof is spaced a short distance from a depending tongue 44 on a bracket-like member 45 which is secured to the door. In addition, the rod 40 is fully retracted and is spaced a considerable distance from the bracket 45. Thus, neither rod engages any part of the bucket 17 when product in the container 20 is weighed.

To shift the door 35 from the position shown in FIG. 2 to the position shown in FIG. 3, the rod 41 is retracted to cause the finger 43 to engage the tongue 44 and pull the door from right-to-left. Once the door reaches the position shown in FIG. 3, the rod 41 is reextended fully to move the finger out of contact with the tongue. When the door is positioned as shown in FIG. 3, the bracket 45 is spaced a short distance from the end of the rod 40 and thus the product in the container 21 may be weighed without either rod causing disturbance in the weigh signal.

Shifting of the door 35 back to the position shown in FIG. 2 is effected by extending the rod 40 to cause the end thereof to engage the bracket 45 and push the door from left-to-right. The rod 40 then is immediately retracted out of contact with the bracket and is returned to the position shown in full lines in FIG. 2.

Further in accordance with the invention, the holding bucket 15 is uniquely constructed to alternately fill the two containers 20 and 21 of the weighing bucket 17 while producing very little fanning of the product 13 in the weighing bucket. For this purpose, the holding bucket comprises a box-like receptacle 48 (FIGS. 4 and 5) mounted on a support frame 49. Two clamshell-type closures or gates 50 and 51 are pivotally connected to the receptacle and are adapted to be swung independently between open and closed positions. When the clamshell 50 is open, product in the receptacle 48 drops into the container 20. After the clamshell 50 has been closed, the clamshell 51 is opened to allow product in the receptacle 48 to drop into the container 21.

Each clamshell 50, 51 includes a pair of side walls 55 (FIG. 5) which straddle the sides of the receptacle 48 and further includes a bottom wall 56 which, when closed, closes off one-half of the lower end of the receptacle. When both clamshells are closed, the two bottom walls converge toward one another as such walls progress downwardly (see FIG. 1). In addition, the lower ends of the clamshells are disposed in upwardly spaced alinement with the upper ends of the inclined inboard sides 23 of the containers 20 and 21 when both clamshells are closed.

The side walls 55 of each clamshell 50, 51 are pivotally connected at 59 to the side walls of the receptacle 48 and to the frame 49. As shown in FIGS. 1 and 5, the pivots 59 are located near the extreme upper ends of the clamshells. As a result, the clamshells swing through a relatively flat arc as they open and close and thus there is very little fanning of the product 13 in the weighing bucket 17. Reciprocating pneumatic actuators 60 and 61 are suitably connected at 62 and 63 to the clamshells 50 and 51, respectively, and are operable to pivot the clamshells between their open and closed positions.

The operation of the foregoing arrangement now will be explained with reference to the holding bucket 15 and the weighing bucket 17 shown at the right-hand side of FIG. 1. Let it be assumed that the door 35 is located in its first position as shown in FIGS. 1 and 2 so that the lower end of the container 20 is closed while the lower end of the container 21 is open. Let it further be assumed that the container 21 has been fully emptied during a previous cycle, that the container 20 has been filled with product which has been weighed and that both clamshells 50 and 51 of the holding bucket 15 are closed. Finally, assume that the microprocessor selects the right-hand weighing bucket 17 as one of the combination of buckets to be dumped and that the microprocessor produces a dump signal.

When the dump signal is produced, the mechanism 38 causes the door 35 to shift from right-to-left toward a position opening the container 20 and closing the container 21. At substantially the same time the door 35 begins moving, the actuator 61 starts opening the clamshell 51 to enable product to fall from the holding bucket 15 into the container 21.

Thus, product starts falling out of the container 20 at substantially the same time product starts falling into the container 21. Although the clamshell 51 starts opening before the door 35 fully closes the container 21, the door catches the falling product as the door moves from right-to-left.

The clamshell 51 is closed at approximately the same time the door 35 reaches a position fully closing the container 21. The weight signal then may be processed by the microprocessor.

The next dump cycle of the right-hand weighing bucket 17 then proceeds immediately if the right-hand weighing bucket is one of the buckets of the newly selected combination. Thus, the door 35 is shifted from left-to-right by the mechanism 38 to a position opening the container 21 and closing the container 20. At substantially the same time the door starts moving, the actuator 60 starts opening the clamshell 50 so that product begins falling into the container 20 as product begins falling out of the container 21. The clamshell 50 closes at about the same time the door fully closes the container 20.

From the foregoing, it will be apparent that the present invention brings to the art new and improved weighing apparatus 10 which is extremely fast in operation since each weighing bucket 17 is formed by two compartments or containers 20 and 21 which are alternately filled without need of waiting for the previously weighed product to clear the other container. A scale with ten of the new and improved weighing buckets 17 of the invention may operate accurately at speeds as high as 100 weigh cycles per minute as opposed to a maximum accurate operating speed of about 60 weigh cycles per minute of conventional commercially available scales in which a door means opens a weighing bucket, dwells while product falls from the bucket, and then closes to enable the bucket to be re-filled.

I claim:

1. Weighing apparatus comprising a weighing bucket unit having first and second side-by-side and generally upright containers for momentarily holding product to be weighed, means associated with said weighing bucket unit for producing a signal representative of the weight of the product in said containers, means for receiving the product from the containers after the product has been weighed, each of said containers having open upper and lower ends, metering means positioned above said containers for intermittently dropping alternate batches of product into the upper ends of alternate containers whereby the containers are filled alternately, a door mounted to shuttle back and forth beneath the lower ends of said containers along a substantially linear path, means for moving said door along said path between (1) a first position in which the door opens the lower end of said first container and closes the lower end of said second container and (2) a second position in which the door closes the lower end of said first container and opens the lower end of said second container, said last-mentioned means moving said door from said first position toward said second position at substantially the same time said metering means start dropping product to said first container and moving said door from said second position toward said first position at substantially the same time said metering means start dropping product to said second container whereby product may be dropped to one container while product is dropping out of the other container.

2. Weighing apparatus as defined in claim 1 in which said moving means is de-coupled from and out of contact with said door when said door is in either position and said product is being weighed.

3. Weighing apparatus as defined in claim 1 in which said metering means comprise a receptacle for product and further comprise first and second clamshell gates located above said first and second containers, respectively, and independently mounted on said receptacle to pivot individually between open and closed positions with respect to said receptacle, means for moving said first gate to its open position at substantially the same time said door starts moving from its first position toward its second position to close said first container and for returning said first gate to its closed position prior to the time said door starts moving from its second position toward its first position to open said first container, and means for moving said second gate to its open position at substantially the same time said door starts moving from its second position toward its first position to close said second container and for returning said second gate to its closed position prior to the time said door starts moving from its first position toward its second position to open said second container.

4. Weighing apparatus comprising a weighing bucket unit having first and second side-by-side and generally upright containers for alternately holding alternate batches of product to be weighed, means associated with said weighing bucket unit for producing a signal representative of the weight of the product in said containers, means for receiving the product from the containers after the product has been weighed, each of said containers having open upper and lower ends, metering means positioned above said containers for intermittently dropping batches of product into the upper ends of said containers, said metering means comprising receptacle means for holding product and further comprising automatically operable closure means movable repetitively first to release product to drop from said receptacle means only to said first container and movable next to release product to drop from said receptacle means only to said second container whereby said containers are filled alternately, a door mounted to shuttle back and forth beneath the lower ends of said containers along a substantially linear path, means for moving said door along said path between (1) a first position in which the door opens the lower end of said first container and closes the lower end of said second container and (2) a second position in which the door closes the lower end of said first container and opens the lower end of said second container, said last-mentioned means moving said door from said first position toward said second position at substantially the same time said closure means move to start releasing product to said first container and moving said door from said second position toward said first position at substantially the same time said closure means move to start releasing product to said second container whereby product may be dropped to one container while product is dropping out of the other container.

5. Weighing apparatus as defined in claim 4 in which said receptacle means and said closure means comprise a receptacle for product and further comprise first and second clamshell gates located above said first and second containers, respectively, and independently mounted on said receptacle to pivot individually between open and closed positions with respect to said receptacle, means for moving said first gate to its open position at substantially the same time said door starts moving from its first position toward its second position to close said first container and for returning said first gate to its closed position prior to the time said door starts moving from its second position toward its first position to open said first container, and means for moving said second gate to its open position at substantially the same time said door starts moving from its second position toward its first position to close said second container and for returning said second gate to its closed position prior to the time said door starts moving from its first position toward its second position to open said second container.

6. Weighing apparatus as defined in claim 4 in which the adjacent inboard sides of said side-by-side containers are inclined to the vertical such that said adjacent sides diverge away from one another as said sides progress downwardly, the upper ends of said sides being located closely adjacent one another, said receptacle means and said closure means comprising a receptacle for product and further comprising first and second clamshell gates located above said first and second containers, respectively, and independently mounted on said receptacle to pivot individually between open and closed positions with respect to said receptacle, said gates having bottom walls which, when said gates are in their closed positions, converge toward one another as said walls progress downwardly, the lower ends of said bottom walls being spaced upwardly from and being alined vertically with the upper ends of said adjacent sides of said buckets when said gates are in their closed positions, means for moving said first gate to its open position at substantially the same time said door starts moving from its first position toward its second position to close said first container and for returning said first gate to its closed position prior to the time said door starts moving from its second position toward its first position to open said first container, and means for moving said second gate to its open position at substantially the same time said door starts moving from its second position toward its first position to close said second container and for returning said second gate to its closed position prior to the time said door starts moving from its first position toward its second position to open said second container.

7. Weighing apparatus as defined in claim 6 in which said gates close the lower end of said receptacle when both gates are in their closed positions, each gate sweeping outwardly above the upper end of its respective container and opening part of the lower end of the receptacle when the gate is pivoted to its open position.

8. Weighing apparatus as defined in claim 7 in which each of said gates is pivotally connected to said receptacle at a point located closely adjacent the extreme upper end of said gate.

9. Weighing apparatus comprising a weighing bucket unit having first and second side-by-side and generally upright containers for momentarily holding product to be weighed, means associated with said weighing bucket unit for producing a signal representative of the weight of the product in said containers, means for receiving the product from the containers after the product has been weighed, each of said containers having open upper and lower ends, metering means positioned above said containers for intermittently dropping alternate batches of product into the upper ends of alternate containers whereby the containers are filled alternately, a door mounted to shuttle back and forth beneath the lower ends of said containers along a substantially linear path, actuator means for moving said door along said path between (1) a first position in which the door opens the lower end of said first container and closes the lower end of said second container and (2) a second position in which the door closes the lower end of said first container and opens the lower end of said second container, said actuator means moving said door from said first position toward said second position at substantially the same time said metering means start dropping product to said first container and moving said door from said second position toward said first position at substantially the same time said metering means start dropping product to said second container whereby product may be dropped to one container while product is dropping out of the other container, said actuator means being physically de-coupled from and being out of contact with said door whenever said door is in either position and said product is being weighed whereby said weight signal is substantially free of influence from vibrations in said actuator means.

10. Weighing apparatus as defined in claim 9 in which said actuator means comprise a first actuator for pushing said door in one direction from one of said positions to the other of said positions and further comprise a second actuator for pulling said door in the opposite direction from said other position to said one position.

11. Weighing apparatus as defined in claim 10 in which said first actuator moves in said opposite direction and out of contact with said door immediately after said first actuator has pushed said door to said one position, said second actuator moving in said one direction and out of contact with said door immediately after said second actuator has pulled said door to said other position.

* * * * *